(12) United States Patent
Mueller

(10) Patent No.: US 6,848,356 B1
(45) Date of Patent: Feb. 1, 2005

(54) BLENDING APPARATUS FOR ICE CREAM

(76) Inventor: Peter Michael Mueller, 4584 Campenille Trace, Suwanee, GA (US) 30024

( * ) Notice: Subject to any disclaimer, the term of this patent is extended or adjusted under 35 U.S.C. 154(b) by 74 days.

(21) Appl. No.: 10/683,354

(22) Filed: Oct. 14, 2003

(51) Int. Cl.[7] .......................... A23G 9/00; A23G 9/02; A23G 9/12; B01F 7/24; B01F 15/00
(52) U.S. Cl. .......................... 99/455; 99/348; 99/460; 99/494; 366/138; 366/286; 366/319
(58) Field of Search .......................... 99/348, 352–355, 99/452–466, 494; 366/286, 319, 138, 206, 144–149, 186, 203, 207, 389, 318, 332, 333; 62/68, 320, 342, 343, 258; 222/418; 426/518, 519; 241/282.1, 246, 247, 199.12, 260.1, 292

(56) References Cited

U.S. PATENT DOCUMENTS

| | | | | |
|---|---|---|---|---|
| 4,448,114 A | * | 5/1984 | Mayer ........................ 99/494 |
| 4,502,377 A | * | 3/1985 | Hall, Jr. ........................ 99/492 |
| 4,590,852 A | * | 5/1986 | Mayer et al. ................. 99/455 |
| 4,671,172 A | * | 6/1987 | Stiglich ....................... 99/460 |
| 4,708,489 A | * | 11/1987 | Carlson ...................... 366/149 |
| 4,740,088 A | * | 4/1988 | Kelly, Jr. ..................... 366/138 |
| 4,974,965 A | * | 12/1990 | Heinhold et al. ........... 366/289 |
| 5,067,819 A | * | 11/1991 | Heinhold et al. ........... 366/138 |
| 5,439,289 A | * | 8/1995 | Neilson ...................... 366/207 |
| 5,680,769 A | * | 10/1997 | Katz .............................. 62/68 |
| 6,318,889 B1 | * | 11/2001 | Hansen, Sr. ................ 366/289 |
| 6,341,887 B1 | * | 1/2002 | Hansen, Sr. ................ 366/138 |

* cited by examiner

Primary Examiner—Timothy F. Simone
(74) Attorney, Agent, or Firm—David P. Kelley

(57) ABSTRACT

An improved ice cream blending apparatus has a hopper support system that incorporates a hopper guidance mechanical linkage that supports the linear motion of the hopper and translates non-linear circular motion of the operating handle into the linear motion of the hopper.

19 Claims, 8 Drawing Sheets

BLENDING APPARATUS FOR ICE CREAM

FIELD OF THE INVENTION

This invention relates generally to ice cream blenders and more particularly to the hopper guidance system in an ice cream blending apparatus. The improved system includes linkage that translates operating handle pivotal or nonlinear motion into straightline motion.

BACKGROUND OF THE INVENTION

Ice cream blender apparatus produce mixed ice cream for consumption using single or multiple combinations of ice cream and additional added ingredients. The blended ice cream generally consists of a single flavor of ice cream and several additives such as nuts, fruit, or candy. The ingredients are introduced in combination into a hopper and stirred by the operator through a mixing paddle mechanism to more generally mix the ingredients into a uniform consistency and distribution. The mixing paddle mechanism is generally attached to a motorized drive source, and the hopper or the mixing paddle are moved into contact with the ingredients in the hopper and blended. Dispensing of the blended mixture is achieved usually by pouring of the blended mixture out of the hopper by the operator or by extrusion from the hopper by the mixing paddle mechanism or other extrusion means.

In a conventional ice cream blender apparatus, a hopper is mounted for reciprocal, straight-line motion at rates sufficient to blend the hopper contents at a single serving per minute. The hopper is typically of conical profile with an opening of six-inch diameter at the open end of the profile, and an extrusion opening at the opposing end of one half-inch diameter. The conical axis of the hopper is oriented vertically, or Y-axis, with its conical axis coincident to the rotating mixing paddle axis, which is also oriented vertically. The mixing paddle and hopper share a similar profile to facilitate the paddle surfaces being able to sweep the interior volume of the hopper and thusly mix the contents.

The hopper can be supported for straight line, or Y-axis, motion by a mounting structure that incorporates linear bearing technology. The hopper can be positioned below the mixing paddle, with the straight line Y-axis motion bringing the mixing paddle into the interior volume of the hopper by motion of the hopper. Conversely, the straight-line motion can also be applied to the mixing paddle, and the mixing paddle brought into the stationary hopper. Alternately, the mixing paddle and hopper can be brought into the common mixing position by straight line Y-axis motion of both the mixing paddle and the hopper. However, because the hopper is typically motivated by the linkages, cams, and connections, elements of both X-axis and Z-axis motion and corresponding axis reaction forces may be present in the reciprocal motion of the hopper. The stroke length, that is the distance traveled by the movable hopper, is generally between about 8 to 14 inches. As a general rule, for a given ice cream blender apparatus, the shorter the hopper stroke, the less affect the X-axis and Z-axis axis reaction forces disturb the alignment of the hopper and mixing paddle, and the less severe the wear on the components providing the desired Y-axis motion. Misalignment as small as between about 0.0005 and 0.0010 inches can result in the loading of bearing and other support components to cause premature failure and misalignment with repeated cycling. As can be appreciated, it is an ongoing objective of the ice cream blending industry to enhance the operation of the hopper by minimizing to the extent possible, any transient X or Z-axis motion in the hopper.

In conjunction with the reciprocal motion of the hopper, a mixing paddle is supported such that rotation of the mixing paddle is about the Y-axis. The rotation is achieved by supporting a shaft on a bearing pair mounted in the fire, to which the mixing paddle has a shaft attachment point. The shaft can be connected to a motorized prime mover through belts/pulleys, chain/sprocket, and/or gears, or combination thereof, such that powering of the motor, or manual operation of the prime mover by the operator, turns the mixing paddle. The mixing paddle is generally turned and continues turning as the hopper containing the ingredients to be blended is brought up into contact with the mixing paddle. The mixing paddle assists in blending the ingredients and the hopper is withdrawn when desired blending consistency is achieved. Contents of the hopper are then extracted or have been concurrently extracted during the blending process using the aforementioned extrusion features of the hopper and mixing paddle if present. The hopper is the component utilizing the Y-axis motion capability, but as mentioned, a mixing paddle or the combination of mixing paddle and hopper may be involved in this motion. Typically, mechanical linkage connection is provided between the operator handle of the ice cream blender apparatus and the hopper Y-axis motion. An electrical circuit containing an actuation switch closes the prime mover circuit upon operator handle motion to activate the motor driving the mixing paddle.

In order to fully appreciate the various aspects of this invention, it is critical to understand certain fundamental features of a typical ice cream blending apparatus. Referring to FIG. 1, an illustration of the typical ice cream blender apparatus will be discussed. The typical ice cream blender apparatus is generally indicated by the reference character 10. The ice cream blender apparatus 10 includes a frame or housing structure 12 having mounted thereon an electric motor 13 with attached pulley 14 on motor shaft 15 that drives a large pulley wheel 16 through belt connection 17. The pulley wheel is mounted on one vertically aligned auger shaft 8 so as to transmit torque between the motor and the auger shaft. The auger shaft rotates in radial bearings 31 and 32 mounted in opposed plates of the frame. The auger shaft axis 19 is coincident to the vertical Y-axis of the ice cream blender apparatus. A mixing paddle 20 is attached to the lower end of the auger shaft, and connected such that it is stationary relative to the auger shaft. Hence rotation of the motor, produces corresponding rotation of the mixing paddle about the Y-axis through the mechanical connections.

The hopper motion assembly generally designated by reference character 30 of a conventional ice cream blender apparatus includes a hopper guide shaft 40, hopper support 41, lower swing lever 68, upper swing lever 70, and operating handle 75. The hopper guide shaft is guided in linear bearings 81 and 82 coaxially mounted in opposed plates of the frame so as to position conical hopper 50 axis 51 coaxial with the auger shaft axis and the Y-axis. This is achieved by attaching the hopper support to one end of the hopper guide shaft, and the hopper to the hopper support temporarily at 52 to allow for removal of the hopper for cleaning and content dispensing while achieving coaxiality during placement. A first end 67 of the lower swing lever is pinned to the second end of the hopper guide shaft at 43 so as to create a pivot joint. A second end of the lower swing lever is pinned to the first end 66 of the upper swing lever at 71 so as to create a pivot joint. The upper lever swing lever is connected at it's second end to fixed point 78 on the frame members to create a pivot joint. The operator handle is also rigidly attached to the second end of the upper swing lever. Hence movement of the operator handle about pivot point 78 moves the upper swing lever about point 78, which moves the lower swing lever, which axially moves the hopper guide shaft, which in turn has the hopper support and hopper attached, and thereby moves the hopper along the Y-axis. By this combination of mechanical connections, the hopper can be moved upwards toward the mixing paddle to place the mixing paddle within the hopper interior volume for ice cream and ingredients to be blended.

The use of pinned joints and linkages/components producing forces non-coaxial with the center-line of the hopper guide shaft causes moment loading to be seen on the hopper guide shaft linear bearings. The hopper guide shaft, having a centerline offset to the auger shaft, also causes moment loading on the hopper guide shaft linear bearings and other components. These loads are generated from the weight of the components attached and the forces associated with contact of the mixing paddle with the hopper and ingredients during blending. All these non-coaxial forces cause premature wear to the bearings, pinned joints, and components, resulting in short life and increased misalignment to the system through contact wear.

SUMMARY OF THE INVENTION

According to the present invention, an improved ice cream blending apparatus includes the application of a unique linkage system that translates the motion of the operator handle into the linear motion of the hopper. This linkage substantially eliminates the presence of any transient X-axis and Z-axis movement in the hopper as it reciprocates in the ice cream blending apparatus. The ice cream blending apparatus includes a frame which supports a drive mechanism including an operating handle that is adapted for rotation about a first axis mounted in the frame. A hopper is mounted on a hopper guide shaft structure for reciprocal, straight-line motion in the frame. The present invention provides a connecting straight-line motion assembly that is operatively associated with the operating handle in order to impart reciprocal motion to the hopper guide shaft structure.

The invention is a hopper guidance linkage for use in an ice cream blender apparatus for the blending of ice cream and ingredients. The ice cream blender apparatus comprises a frame; a drive mechanism including an operator handle adapted for rotation about a first axis located in the frame; and hopper guide shaft structure mounted in the frame for reciprocal, straight line or Y-axis motion. Links are operatively connected between the operator handle and the hopper guide shaft structure for imparting the reciprocal motion to said hopper guide shaft structure. The hopper guidance linkage is in mechanical communication with the hopper guide shaft structure and the operator handle.

The hopper guidance linkage includes a first pivot point and a second pivot point wherein an axis is defined between the first and second pivot points. Four links of a first predetermined length define in combination four pivot points at the intersection of adjacent links. The pivot points form a rhombus configuration on the straight line linkage assembly.

A lever arm has a first end mounted for pivotal motion about the second pivot point and a second end extends there from. There is mounted on the lever arm second end a second rhombus pivot point. Third and forth rhombus pivot points are disposed between the first and second rhombus pivot points. The second pivot point is disposed between the first pivot point and the second rhombus pivot point. Finally, first and second lateral links are connected between the first pivot point and said third and forth rhombus pivot points. As a result, the pivoting motion of the lever arm about the second pivot point is translated into the reciprocating linear motion of said hopper means.

It is an object of this invention to provide an improved hopper guidance system for use in an ice cream blender apparatus.

It is yet another object of this invention to provide an improved structure for the support and alignment of a hopper while minimizing the amount of mass being reciprocated in conjunction with the ice cream blending operation.

It is another object of this invention to improve the life of ice cream blenders through eliminating components imparting X-axis and Z-axis loads to the components in the hopper guidance system.

BRIEF DESCRIPTION OF THE DRAWINGS

The above as well as other features and advantages of the invention can be more fully appreciated through consideration of the detailed description of the invention in conjunction with the several drawings in which.

DETAILED DESCRIPTION OF A PREFERRED EMBODIMENT

Figure 1:
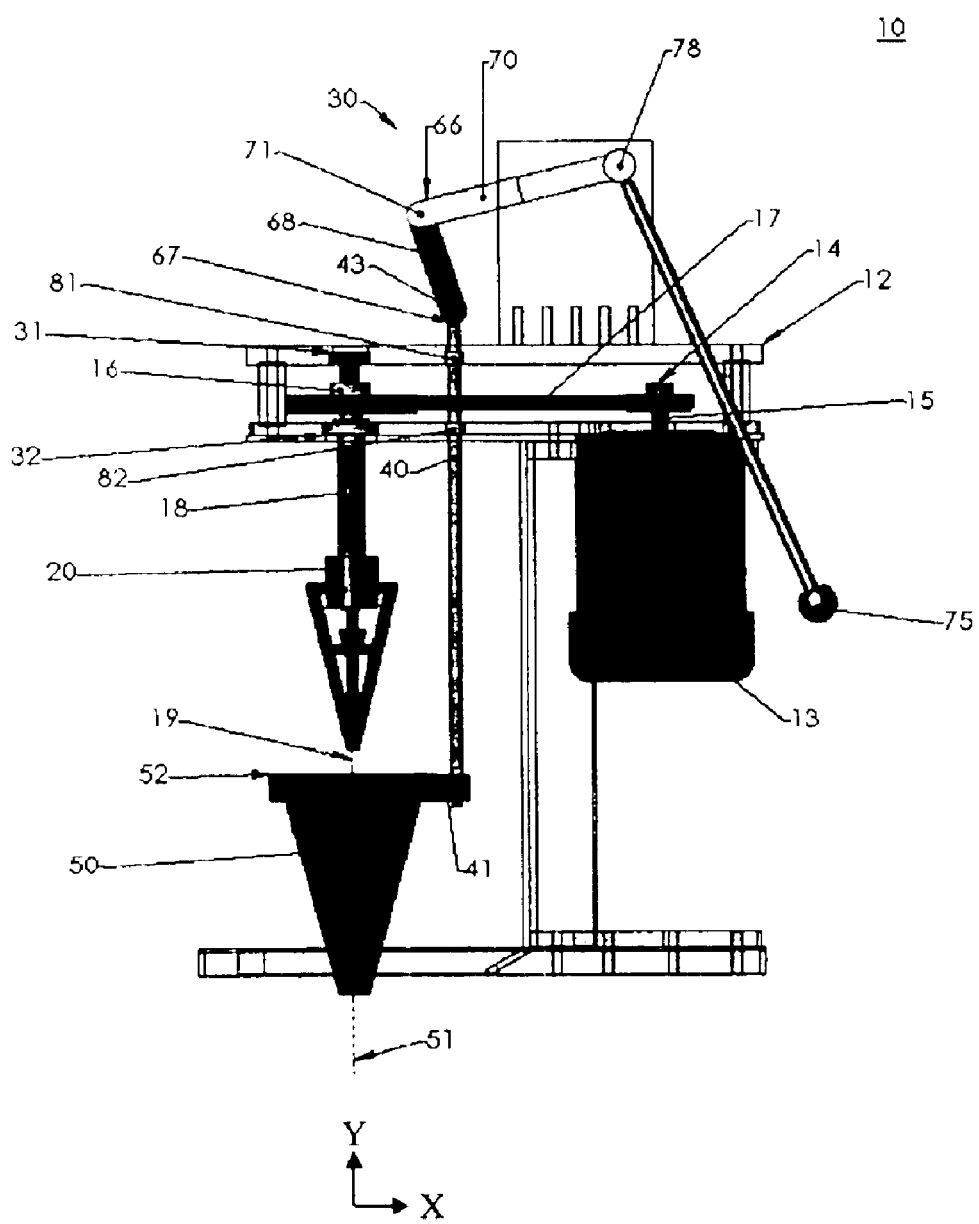
FIG. 1 is a side elevation view of a Prior Art ice cream blender apparatus as practiced and shown in a lowered position in which the hopper is withdrawn from the blending position.
Figure 2:
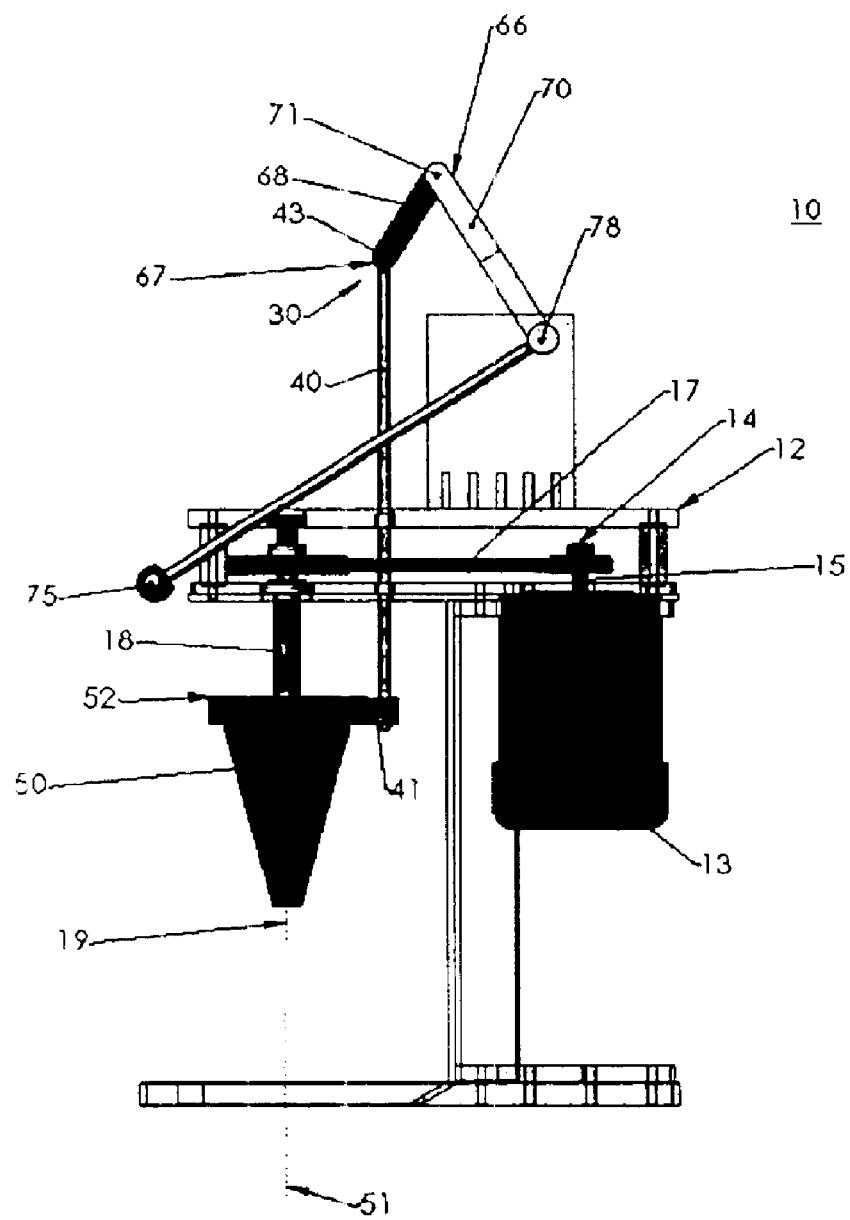
FIG. 2 is a side elevation view of a Prior Art ice cream blender apparatus as practiced and shown in a raised position in which the hopper is in the blending position.
Figure 3:
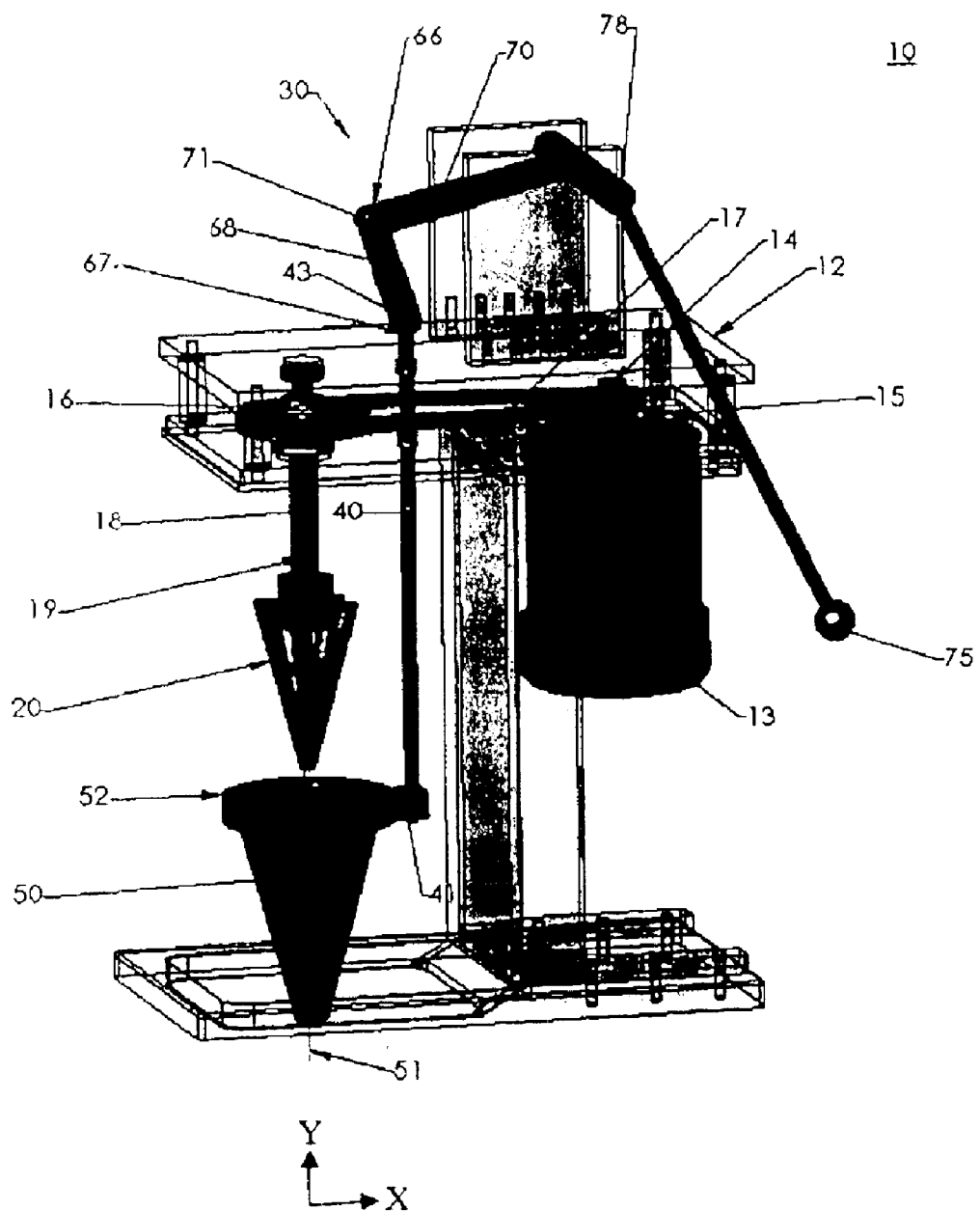
FIG. 3 is a perspective view of a Prior Art ice cream blender apparatus as practiced and shown in a lowered position in which the hopper is withdrawn from the blending position.

Referring to the drawing in which similar reference characters denote similar elements throughout the several views, the attached FIGS. 4 through 9 illustrate an improved ice cream blending apparatus generally designated by reference character 100 comprising a straight line motion assembly generally designated by reference character 101. The ice cream blender apparatus includes a frame or housing structure 120 having mounted thereon an a powering means, wherein the exemplary embodiment, the powering means includes, but is not limited to, an electric motor 130 with attached pulley 140 on motor shaft 150 that drives a large pulley wheel 160 through belt connection 170. The pulley wheel is mounted on one vertically aligned auger shaft 180 so as to transmit torque between the motor and the auger shaft. The auger shaft rotates in radial bearings 310 and 320 mounted in opposed plates of the frame. The auger shaft axis 190 is coincident to the vertical Y-axis of the ice cream blender apparatus. A mixing paddle 200 is attached to the lower end of the auger shaft, and connected such that it is stationary relative to the auger shaft. Therefore, the rotation of the motor produces corresponding rotation of the mixing paddle about the Y-axis through the mechanical connections.

The ice cream ingredients are kept in a container 500 for mixing. In the exemplary embodiment shown in FIGS. 4–9, the container 500 is a conical hopper. However various shapes and configurations may be used based on the user's desire and needs.

Figure 9:
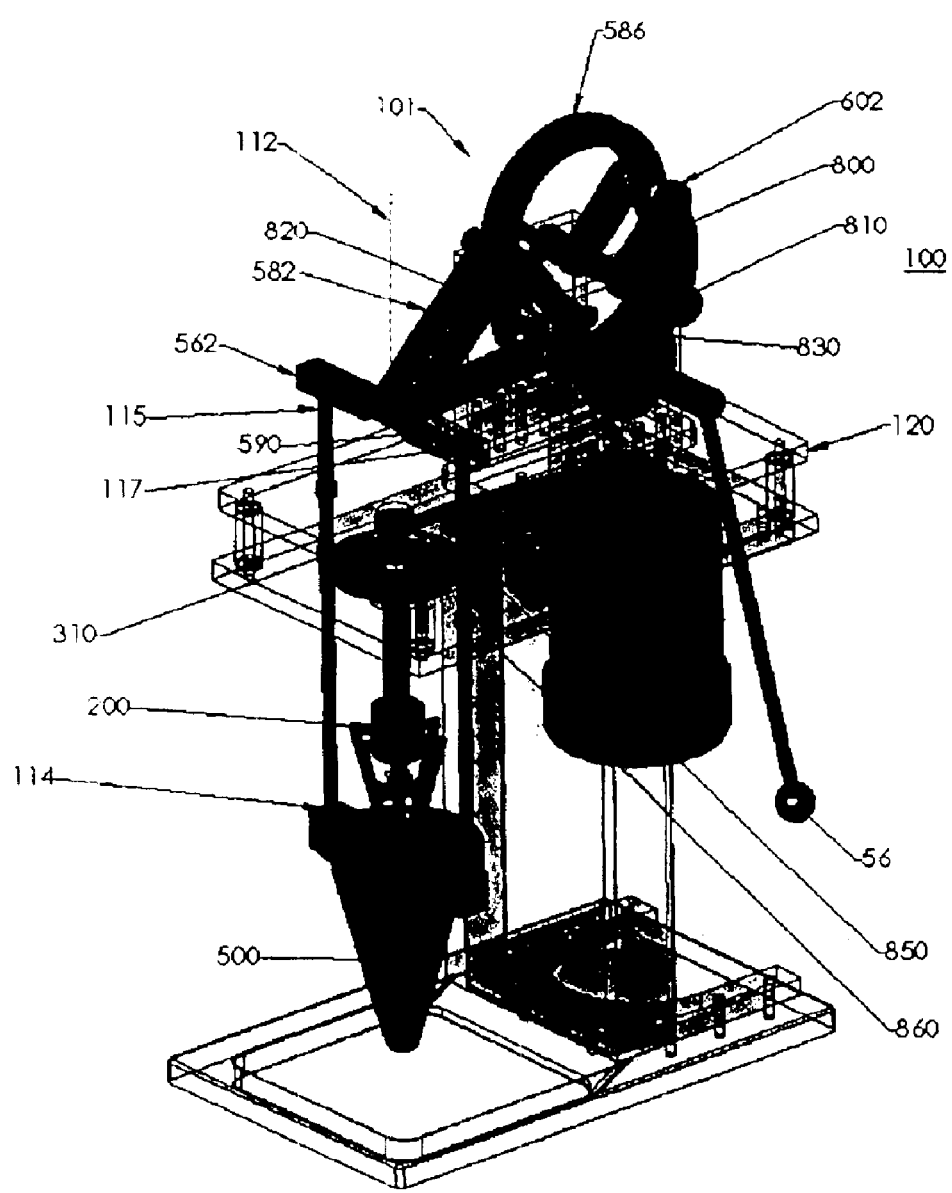
FIG. 9 is a perspective view of the ice cream blender apparatus shown of this invention and shown in a lowered position in which the hopper is withdrawn from the blending position.

A hopper support 110 is attached to at least one guide shaft 111, wherein the exemplary embodiment shown in FIG. 9 the two coplanar guide shafts each have axis 112. The coplanar hopper guide shafts 111 are connected to the hopper support at first ends 114. The coplanar hopper guide shafts 111 are also coplanar to the auger shaft axis 190, and positioned equidistant to this axis. The hopper guide shafts are guided in linear bearings 850 and 860 coaxially mounted in opposed plates of the frame so as to position conical hopper 500 axis 501 coaxial with the auger shaft and Y-axis. This is achieved by attaching the hopper support to one end of the hopper guide shaft such that the hopper axis through attachment to the hopper support is positioned coaxial with the auger shaft axis. The hopper is attached to the hopper support at 113 to allow for removal of the hopper for cleaning and content dispensing. Second ends 115 of the hopper guide shafts are pinned to crossmember 562 at 117 forming a joint. Movement of the crossmember therefore perpetuates simultaneous reciprocal straight-line movement along the Y-axis of the hopper guide shads, hopper support, and hopper.

Figure 4:
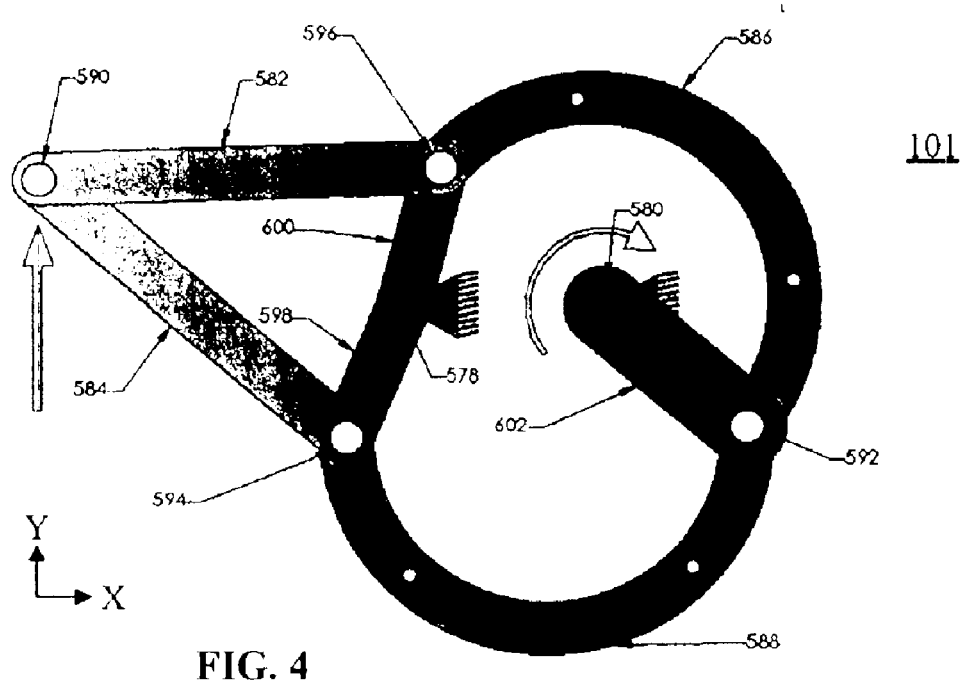
FIG. 4 is a schematic representation of the hopper guidance linkage of this invention, illustrating the Y-axis motion thereof in the raised.
Figure 5:
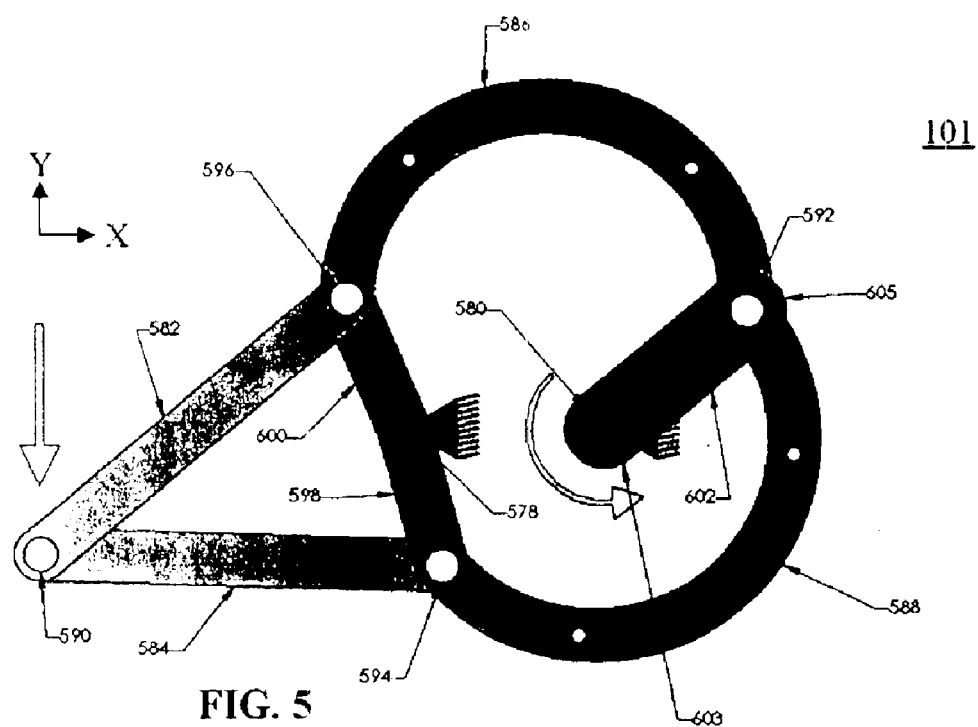
FIG. 5 is a schematic representation of the hopper guidance linkage of this invention, illustrating the Y-axis motion thereof in the lowered.

The straight-line motion assembly is connected to the crossmember at pivot point 590. The upward and downward motion for the hopper, crossmember, and attaching components is accomplished by rotation of the link 602 about pivot point 580 translating this motion into a linear motion of the crossmember by the straight-line motion assembly. The operating principles of this assembly will be described in conjunction with the detailed schematic representation of the mechanical linkage as shown in FIG. 4 and FIG. 5. It should be appreciated that while the mechanical linkage is being described in terms of relatively simple links on one side of the straight-line motion assembly, linkage is provided on both sides of the crossmember. Likewise, as the operator handle 56 is discussed as being a single handle on one side of the ice cream blender apparatus, in practice, a pair of complementary handles, when employed, each disposed to one side of the ice cream blender apparatus center line, provide additional motion initiation capability and allow for operation of the system on either side of the apparatus. Furthermore, various embodiments may be configured from the general concept of the straight-line motion assembly.

Figure 6:
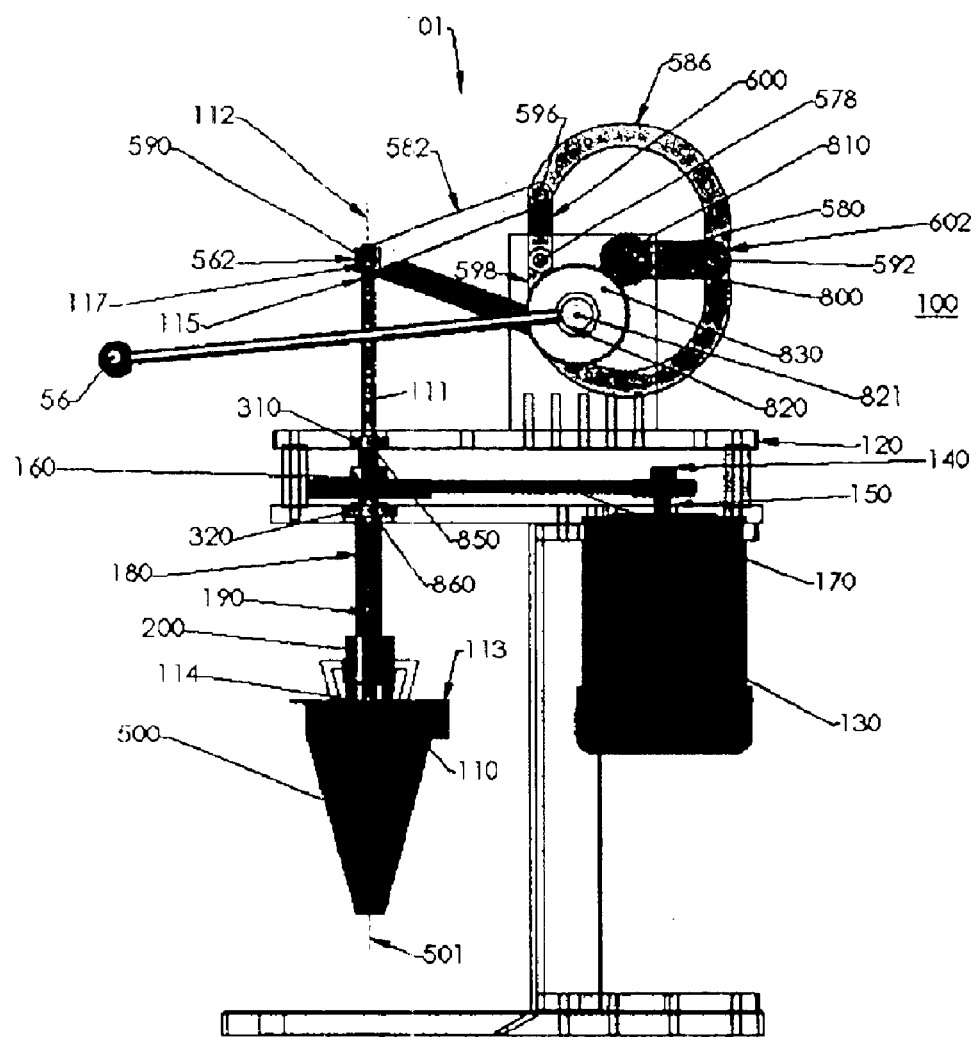
FIG. 6 is a side elevation view of the ice cream blender apparatus of this invention and shown in a neutral position.

The straight-line motion assembly includes a first, fixed pivot point 578 on the frame of the ice cream blending apparatus. A second fixed pivot point 580 is also present in the frame. An axis extending between the first pivot point and the second pivot point is preferably perpendicular to the auger shaft Y-axis. Four links 582, 584, 586, and 588, each include a first and second end, wherein each end point is associated with its respective pivot point These four links define in combination, four pivot points at the intersection of adjacent links. The first pivot point 590 of the four pivot points formed by the rhombus of the four equidistant links 582–588 connects the straight-line motion assembly to the crossmember. Two links 598 and 600 of equal length connect two additional pivot points 594 and 596 to the fixed pivot point 578. It should be appreciated that the four pivot points 590, 592, 594 and 596 form a rhombus shaped configuration. When in a neutral position, as shown in FIG. 6, an axis extends through movable pivot points 590 and 592 and fixed points 578 and 580 Furthermore, the fixed pivot point 580 is mid-way between first fixed pivot point 578 and movable pivot point 592. In the exemplary embodiment, member 582 and 584 are constructed from straight aluminum bars having an equal distance of 7.500 inches between their pivot point centers 590 and 596, and their pivot point centers 590 and 594. Members 586 and 588 are constructed from curved aluminum bars also having an equal distance of 7.500 inches between their pivot point centers 592 and 596, and their pivot point centers 592 and 594, and a radius of curvature of 3.375 inches through their pivot point centers. Member 602 constructed of steel bar has a distance of 3.500 inches between it's pivot point centers 592 and 580. Members 600 and 598 constructed of aluminum bar have an equal distance between their pivot point centers 578 and 596, and their pivot point centers 578 and 594 of approximately 2.693 inches. The fixed pivot points 578 and 580 are separated by a distance of 3.500 inches between their pivot point centers.

A drive shaft 800 is mounted coaxially and allowed to rotate at fixed pivot points 580 in opposed plates of the frame. A lever arm 602 attached at a first end 603 and extending from the drive shaft to a second end 605 is connected to the pivot point 592. It should be appreciated that the specific locations and dimensions described above can be varied to produce amplifications or deamplifications to the ratios of movement, and that the materials and geometries of construction, although exemplary, can be varied.

Figure 7:
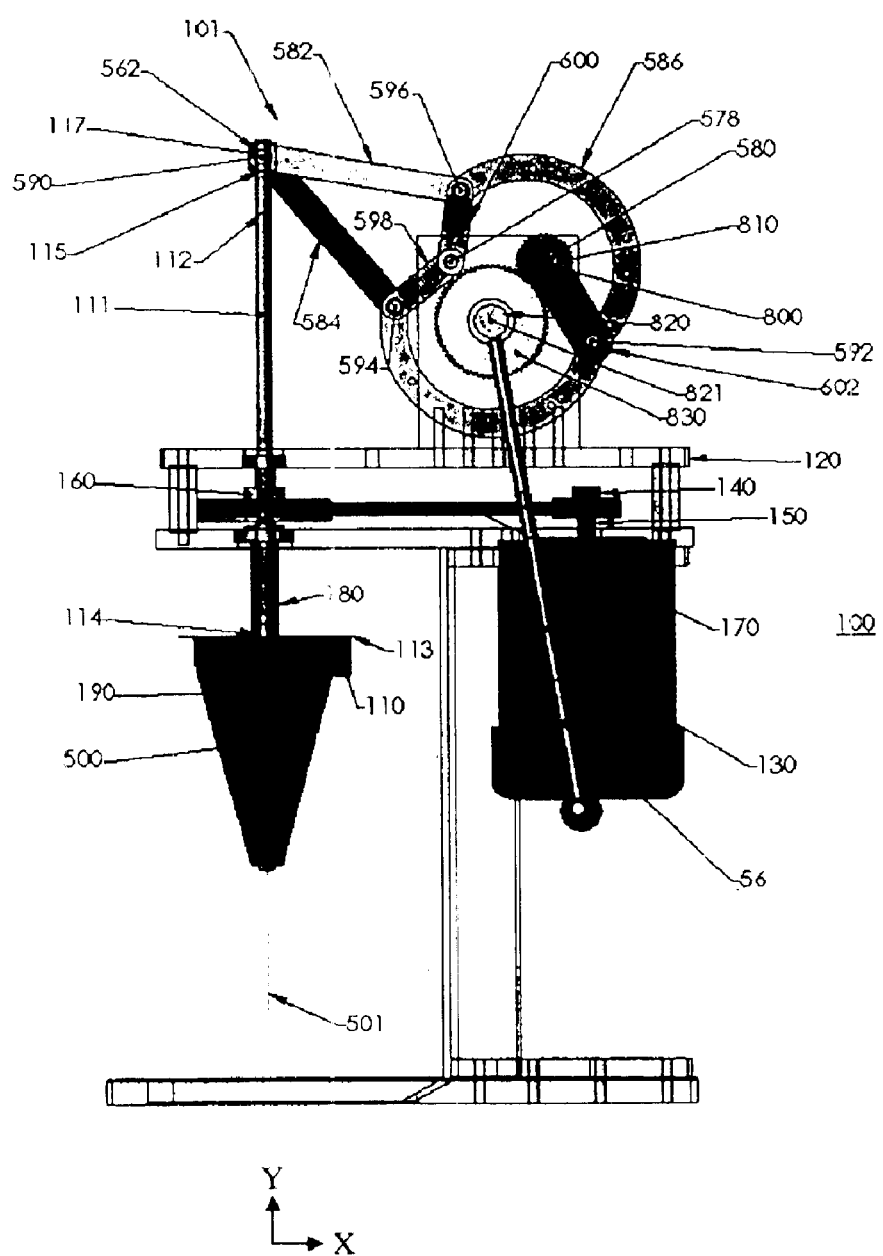
FIG. 7 is a side elevation view of the ice cream blender apparatus of this invention and shown in the raised position in which the hopper is in the blending position.
Figure 8:
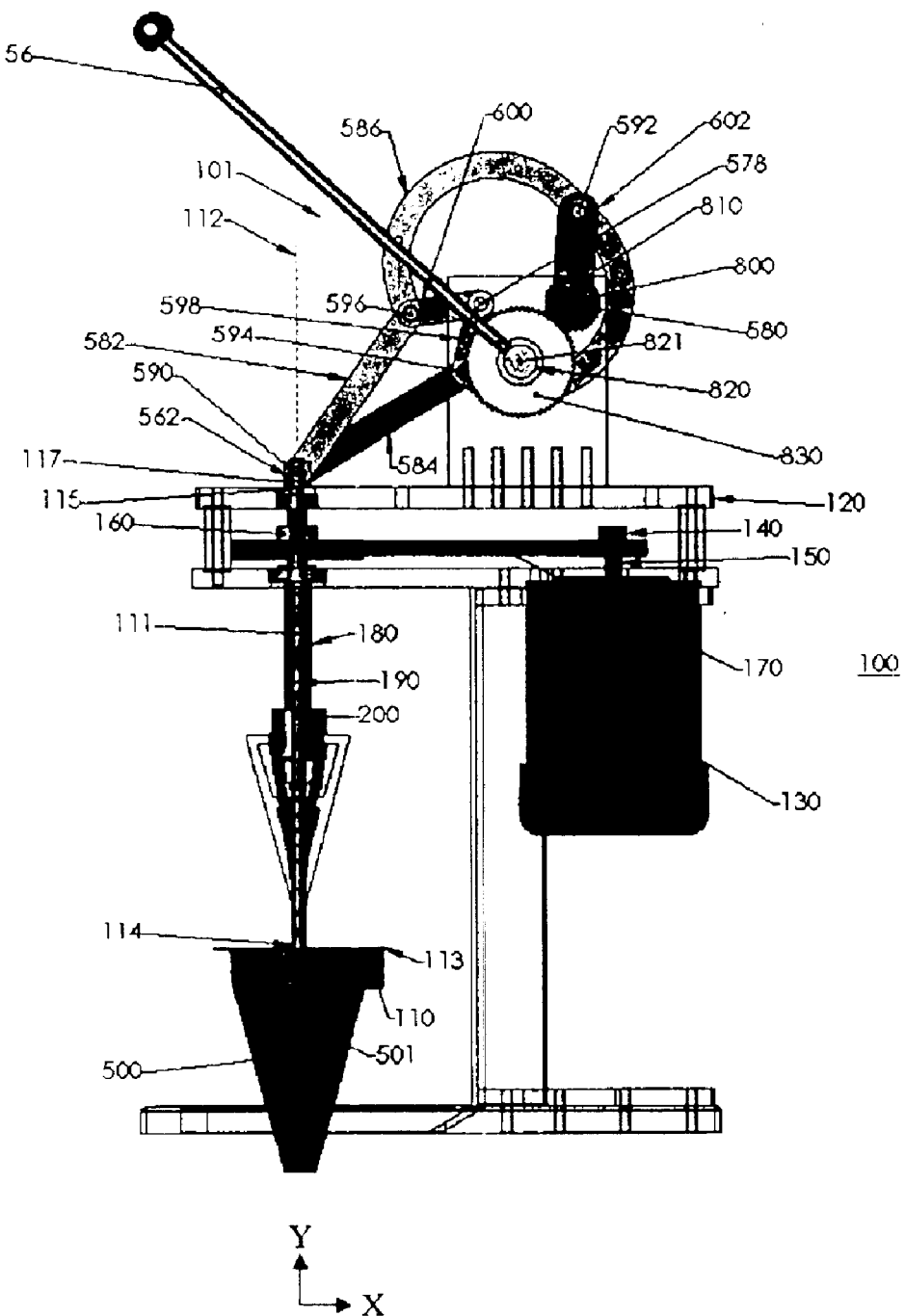
FIG. 8 is a side elevation view of the ice cream blender apparatus of this invention and shown in the lowered position in which the hopper is withdrawn from the blending position.

In operation, when the lever arm 602 is in its downward most position as shown in FIG. 4 and FIG. 7, the crossmember is in its upper position. Likewise, when the lever arm 602 is in its upward most position as shown in FIG. 5 and FIG. 8, the crossmember is in its lower most position and hence the hopper is disengaged from the mixing paddle. As the lever arm 602 pivots about the second fixed pivot point 580, the pivot point 590 associated with the crossmember 562 is compelled to move in a straight line perpendicular to the neutral or center position of pivot points 590, 578, 580 and 592.

The drive shaft 800 has a coaxially connected drive gear 810 keyed to the drive shaft. Input shaft 820 rotates about coaxial fixed pivot points 821 in opposed plates of the frame. Input gear 830 is coaxially connected and keyed to the input shaft 820. The input shaft 820 and drive shaft 800 axes are coplanar and parallel, and separated such that the drive gear and input gear form an intermeshing pair of gears. It should be appreciated that the gear ratios can be varied as desired by the user to change such factors including, but not limited to, the gear diameters employed and the distance between pivot points 580 and 821. It is also known to one skilled in the art that the direction of rotation relative to the intermeshing of gears 810 and 830 can be made identical by substitution of other drive elements such as a belt or chain device, and that the rotation of lever 602 about pivot point 580 may be achieved by any number of means similarly involving multiple motion transfer devices, and that these are included by reference. The operator handle 56 is temporarily attached to the input shaft and provides a lever to convert operator motion of the handle end into rotation of the input shaft.

Hence, reciprocal motion of the operator handle about the input shaft axis of rotation 821 is converted into straight line motion at the crossmember through the straight line motion assembly and consequently into simultaneous straight line movement along the Y-axis, the hopper guide shafts, hopper support, and hopper. By this movement, one can appreciate the positioning of the hopper to the mixing paddle for ice cream blending.

The improved straight-line motion assembly according to this invention is illustrated in FIGS. 4 through 9. It is to be appreciated that this linkage is used in place of the linkage previously described in conjunction with FIG. 1. Accordingly the lower swing lever, upper swing lever, and operating handle are eliminated. The hopper guide shaft is repositioned and duplicated. The hopper is supported such that the forces generated from the blending operation are transmitted to the frame in the Y-axis direction only, imparting no X-axis or Z-axis side loads to the hopper guide shaft bearings. In place of these eliminated, repositioned, and duplicated elements, the straight-line motion assembly is substituted.

One can also appreciate an alternate embodiment where the straight-line motion assembly can also be applied to the reciprocal of the design where the hopper is fixed in position relative to the frame, and the mixing paddle is moved along the Y-axis while rotating. Alternately, an embodiment can also be applied such as to have multiple straight line motion assembly operatively connected to both the hopper guide shafts and the mixing paddle, and can embody features to provide for simultaneous rotation and axial motion of the mixing paddle about the Y-axis.

The present invention has been described in an illustrative manner. It is to be understood that the terminology which has been used is intended to be in the nature of words of description rather Wan limitation. Many modifications and variations of the preset invention are possible in light of the above teachings. Therefore within the scope of the appended claims, the present invention may be practiced otherwise than as specifically described.

What is claimed is:

1. An apparatus for the blending of ice cream having:
   (a) a frame;
   (b) input link means including an operator handle adapted for rotation about a first axis located in said frame;
   (c) hopper guide means mounted in said frame for reciprocal, straight-line motion;
   (d) straight-line motion assembly means in mechanical communication with said hopper guide means and said input link means and operatively connecting said input link means with said hopper guide means for imparting reciprocal motion to said hopper guide means; said straight line motion assembly means including:
      (i) a first pivot point;
      (ii) a second pivot point wherein an axis is defined between said first and second pivot points;
      (iii) four links of a first predetermined length forming a rhombus and defining in combination four pivot points at the intersection of adjacent links, wherein a first rhombus pivot point is on the ram means;
      (iv) a lever arm having a first end mounted for pivotal motion about said second pivot point and a second end depending there from, and on which lever arm is mounted a second rhombus pivot point, and wherein a third and forth rhombus pivot points are disposed between said first and second rhombus pivot points; said second pivot point being disposed between the first pivot point and the second rhombus pivot point; and
      (v) first and second lateral links connected between said first pivot point and said third and forth rhombus pivot points, wherein the pivoting motion of said lever arm about said second pivot point is translated into the reciprocating linear motion of said ram means.

2. An ice cream blending apparatus, comprising:
   (a) a frame structure which supports the various members of the ice cream blending apparatus;
   (b) a container for holding the ingredients to be mixed which is connected to a straight line linkage assembly,
   (c) a mixing device which is attached to the frame member and aligned so it is capable of being received by the container and mix the ingredients within the container;
   (d) a powering means which powers the mixing device;
   (e) the straight line linkage assembly comprising:
      (i) four links which are connected to each other so as to create four pivot points, wherein the pivot points form a rhombus configuration;
      (ii) a lever arm having a first lever arm end and a second lever arm end, wherein the first lever arm end is attached to a first fixed point and the second lever arm end is attached to the first pivot points;
      (iii) a first and second rotating link which are equal in length, and wherein a first end of each of the first and second rotating links is attached to a second fixed point and the second ends of the first and second rotating links are connected to the second and fourth pivot points, respectively.
      (iv) a drive shaft which is through the first fixed point;
      (v) an input shaft which is parallel to and communicates with the drive shaft.

3. The ice cream blending apparatus as claimed in claim 2, wherein the powering means includes a motor.

4. The ice cream blending apparatus as claimed in claim 2, wherein the container is a conical hopper.

5. The ice cream blending apparatus as claimed in claim 2, wherein the mixing device is an auger.

6. The ice cream blending apparatus as claimed in claim 2, wherein the container is connected to the straight line linkage by two parallel members holding the container on opposing sides.

7. The ice cream blending apparatus as claimed in claim 2, wherein two of the links are equal in length.

8. The ice cream blending apparatus as claimed in claim 2, wherein the first link and the second link are equal in length.

9. The ice cream blending apparatus as claimed in claim 2, wherein the third link and the fourth link are equal in length.

10. The ice cream blending apparatus as claimed in claim 9, wherein the third link and the fourth link have an arc shape.

11. The ice cream blending apparatus as claimed in claim 8, wherein the first link and the second link are both linear members.

12. The ice cream blending apparatus as claimed in claim 2, wherein the drive shaft and the input shalt include at least one gear members having a plularity of teeth which communicate with one another.

13. The ice cream blending apparatus as claimed in claim 2, wherein the powering means includes a motor which is connected by a belt and pulley system to the auger member.

14. The ice cream blending apparatus as claimed in claim 2, wherein the distance between the first pivot point and the second pivot point is equal to the distance between the first pivot point and the third pivot point.

15. The ice cream blending apparatus as claimed in claim 2, wherein the distance between the second pivot point and the fourth pivot point is equal to the distance between the third pivot point and the fourth pivot point.

16. The ice cream blending apparatus as claimed in claim 2, wherein the distance between the first fixed point and the first pivot point is equal to the distance between the fist fixed point and the second fixed point.

17. The ice cream blending apparatus as claimed in claim 2, further comprising a handle member which is rotatably attached to the drive shaft.

18. An ice cream blending apparatus, comprising:
  (a) a frame structure which supports the various members of the ice cream blending apparatus;
  (b) a container for holding the ingredients to be mixed which is connected to a straight line linkage assembly;
  (c) a mixing device which is attached to the frame member and aligned so it is capable of being received by the container and mix the ingredients within the container;
  (d) a powering means which powers the mixing device;
  (e) the straight line linkage assembly comprising:
    (i) four links which are connected to each other so as to create four pivot points, wherein the pivot points form a rhombus configuration, wherein the first link and the second link are equal length and the third link and the fourth link are of equal length;
    (ii) a lever arm having a first lever arm end and a second lever arm end, wherein the first lever arm end is attached to a first fixed point and the second lever arm end is attached to the first pivot points;
    (iii) a first and second rotating link which are equal in length, and wherein a first end of each of the first and second rotating links is attached to a second fixed point and the second ends of the first and second rotating links are connected to the second and third pivot points, respectively.
    (iv) a drive shaft which is through the first fixed point;
    (v) an input shaft which is parallel to and communicates with the drive shaft.

19. The ice cream blending apparatus as claimed in claim 17, wherein the container is connected to the straight line linkage by at least two parallel members holding the container on opposing sides.

* * * * *